United States Patent [19]

Frerich et al.

[11] Patent Number: 4,813,348
[45] Date of Patent: Mar. 21, 1989

[54] MACHINE FOR FORMING CYLINDRICAL BALES OF CROP

[75] Inventors: Josef Frerich, Dietrichingen, Fed. Rep. of Germany; Jean Viaud, Sarrequemines, France

[73] Assignee: Deere & Company, Moline, Ill.

[21] Appl. No.: 20,417

[22] Filed: Mar. 2, 1987

[30] Foreign Application Priority Data

Mar. 5, 1986 [GB] United Kingdom ............... 8605466

[51] Int. Cl.⁴ .......................... A01D 91/00; B30B 9/00
[52] U.S. Cl. ........................................... 100/5; 100/88
[58] Field of Search ................... 100/88, 6, 15, 5, 13; 56/341

[56] References Cited

U.S. PATENT DOCUMENTS

| | | | |
|---|---|---|---|
| 4,253,387 | 3/1981 | Schmitt | 100/88 |
| 4,306,494 | 12/1981 | Nishile et al. | 100/88 |
| 4,409,784 | 10/1983 | VanGinhoven | 100/5 |
| 4,505,197 | 3/1985 | Shenberger | 100/5 |
| 4,514,969 | 5/1985 | Moosbrucker | 100/88 X |

FOREIGN PATENT DOCUMENTS 0126278 11/1984 European Pat. Off. ............... 100/5
2137927 10/1984 United Kingdom .

Primary Examiner—Stuart S. Levy
Assistant Examiner—Katherine Matecki

[57] ABSTRACT

A baling machine for forming large cylindrical bales of hay has a variable volume bailing chamber defined by moving belts with a crop inlet on the underside of the machine. When a bale has been completed it is wrapped with net stored in a holder on the back of the baler. The net is advanced by feed rolls through a cutting mechanism below the holder, and is then guided by a plate extending along the underside of a run of the belts to the baling chamber. The plate is in such close proximity to the run that the net is gripped between the plate and belts and is advanced by the moving belts. Finally, the net is cut by the cutting mechanism, the wrapping of net completed, and the bale discharged rearwardly through a gate onto the ground.

5 Claims, 2 Drawing Sheets

MACHINE FORMING CYLINDRICAL BALES OF CROP

BACKGROUND OF THE INVENTION

The present invention relates to a baling machine for forming cylindrical bales of crop.

Machines, towed by a tractor, for forming large cylindrical bales of hay (so called "round balers") are well-known. As the machine advances, the crop is removed from a windrow by a pickup mechanism and delivered rearwardly to a baling chamber where it is rolled into a bale.

There are basically two forms of such machines, namely those with a fixed volume baling chamber defined by driven fixed-position rolls and those with a baling chamber defined by runs of driven belts which move outwardly to enlarge the chamber to accommodate the bale as it grows in size. In both forms, the hay is caused by the driven movement of the rolls or belts to roll round upon itself into a core and the core rotates about its horizontal axis and finally a completed bale is formed, the chamber being fed throughout with hay. The completed bale is tied with twine to maintain its shape and is discharged through a gate formed by a rear portion of the machine.

Various proposals have been made to employ net or foil as a wrapping material instead of twine for balers with a fixed volume baling chamber. A roll of the wrapping material is located at the front or top of the machine and the material is passed through the nip of a pair of feed rolls and then between neighboring fixed-position baling chamber rolls into the baling chamber where it is trapped between the outer surface of the bale and the baling chamber rolls so that it is carried round with the rotating bale and hence wraps round the bale. One such proposal is described in GB-A-2 124 975.

However, in the case of balers with a variable volume baling chamber it is not possible to feed the net or foil between the belts forming the chamber, and the present invention enables bales produced in such a chamber to be wrapped with these materials.

SUMMARY OF THE INVENTION

According to the present invention, there is provided, in combination with a baling machine for forming cylindrical bales of crop of a type having a variable volume baling chamber, an apparatus for wrapping a formed bale with net or foil wrapping material.

An object of the invention is to provide a baling machine, having an expansible baling chamber formed in part by belts defining an inlet at the bottom of the chamber, with a net or foil wrap apparatus which does not interfer with other mechanisms of the bales.

A more specific object of the invention is to provide a baling machine of the expansible chamber type noted above with a net or foil wrap apparatus mounted to the discharge gate of the baling machine.

Yet a further specific object of the invention is to provide a baling machine of the expansible chamber type with a net or foil wrap apparatus mounted to the bale discharge gate and including a holder for a roll of net or foil wrapping material, feed rolls for the wrapping material, and a cutting mechanism for the wrapping material downstream of the feed rolls, the holder being disposed on the back of the gate and a guide being disposed between the cutting mechanism and the inlet so that the wrapping material passes on the underside of the machine to the inlet.

Still another object is to provide a baler with a net or foil wrap apparatus, as described in the immediately preceding object wherein the guide comprises a plate sufficiently close to the underside of the belts that wrapping material on it will be gripped between it and the belts and advanced by the belts to the inlet.

These and other objects, features and advantages of the present invention will become apparent to those skilled in the art from the description which follows and from the drawings.

DESCRIPTION OF THE PREFERRED EMBODIMENT

Figure 1:
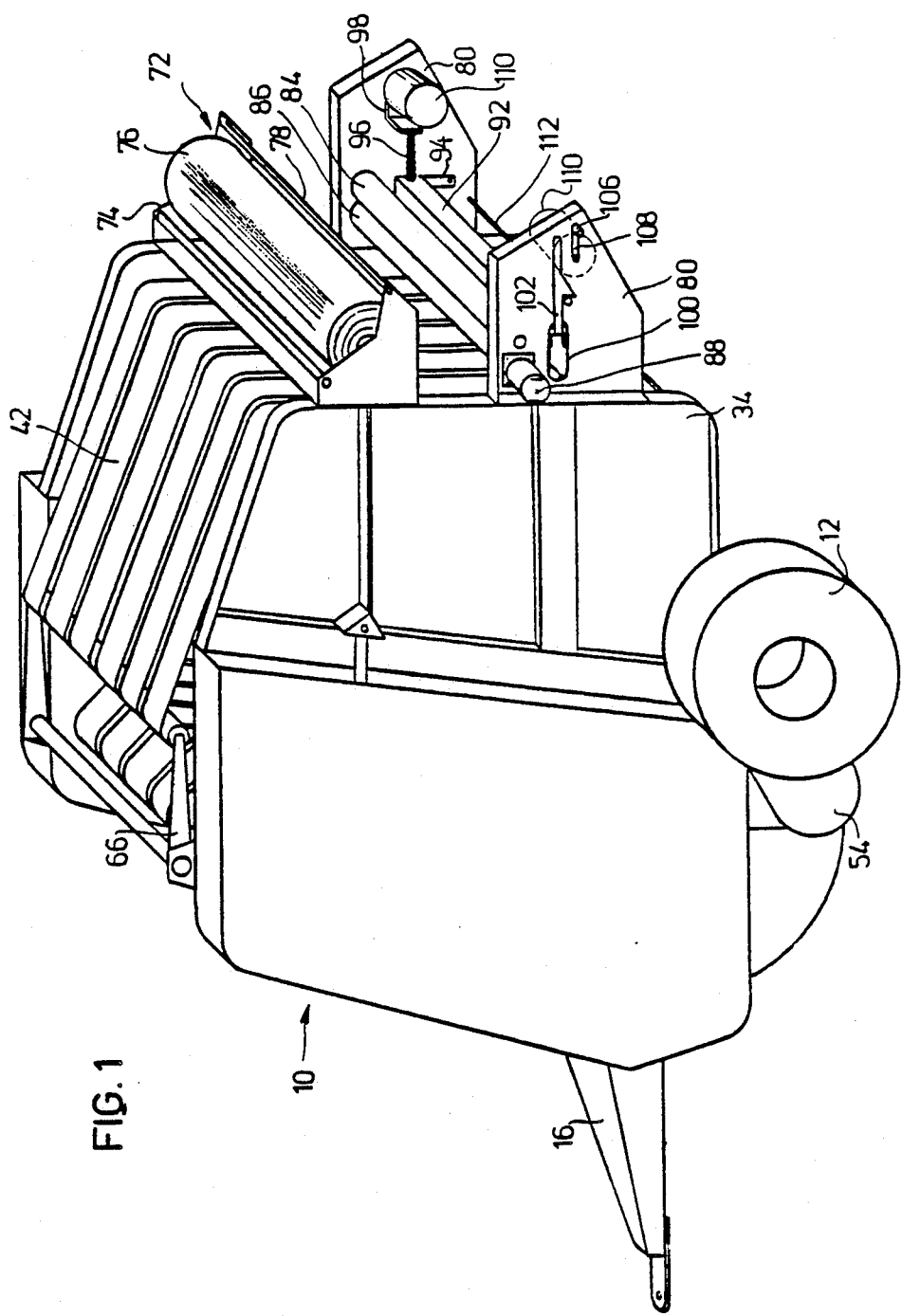
FIG. 1 is a perspective view of the left-hand side and rear of a machine of the present invention for forming large cylindrical bales of hay with some items omitted.

In the drawings, the baler includes a main frame 10 mounted on a pair of wheels 12. The main frame has an upright fore-and-aft extending wall 14 on either side connected by transverse beams (not shown). A draft tongue 16 is connected to a transverse beam at the front of the frame 10 and extends forwardly for attaching the baler to a tractor (also not shown) which draws the machine.

A plurality of lateral rolls extend over the width of the machine. One set of rolls 18, 20, 22 24, 26 is journalled in the sidewalls 14, while another set consisting of rolls 28, 30, 32 is journalled in a swingable gate 34. There is also a pair of chamber restricting rolls 36, 38 and two belt take-up rolls 40, 41.

Figure 2:
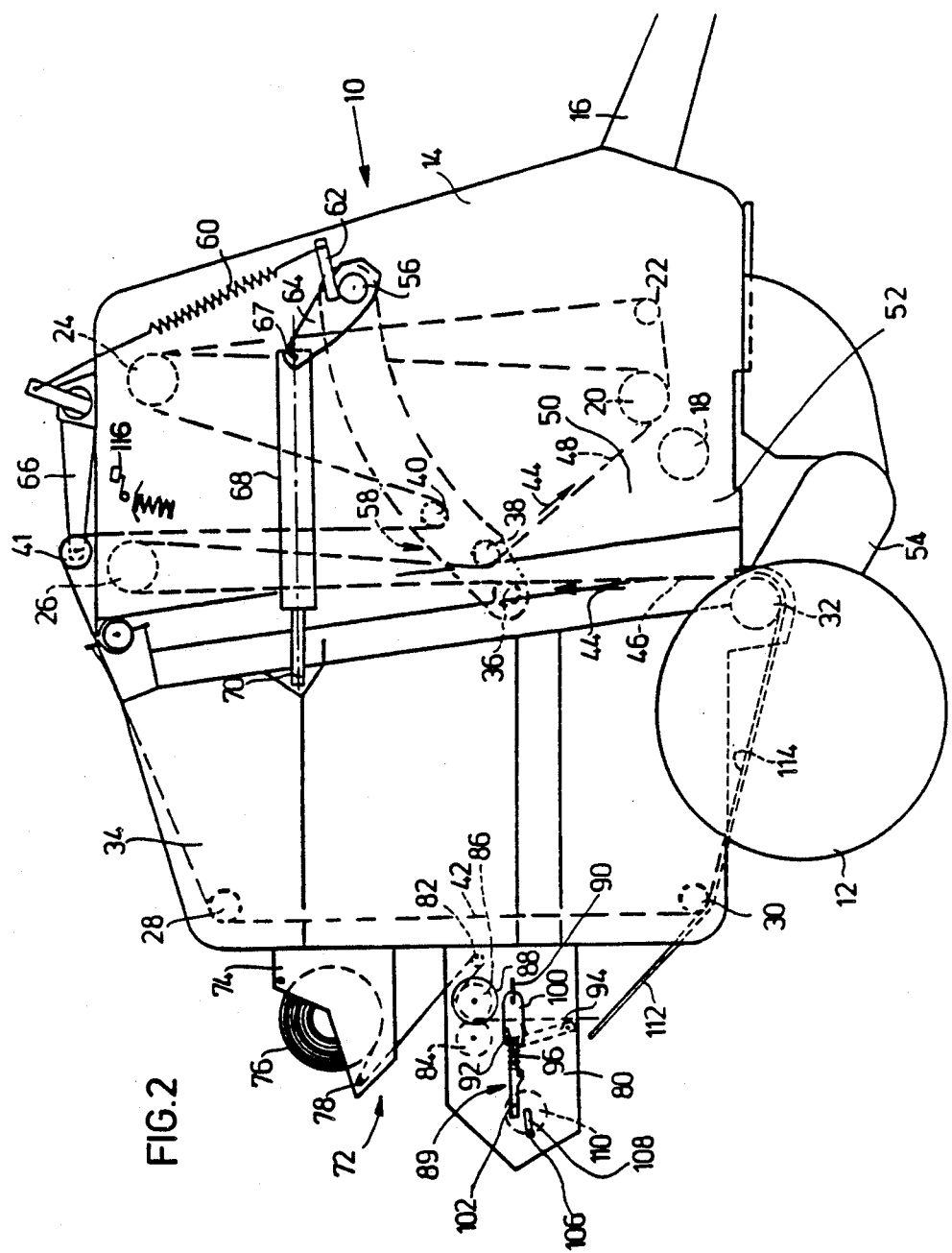
FIG. 2 is a view of the machine from the left showing details within the machine.

Six rubber belts 42 are trained side-by-side over the rolls, with the exception of the roll 18 which acts as a stripper roll, to provide the configuration shown and they move in the direction indicated by arrows 44, the stripper roll 18 being driven anticlockwise as viewed in FIG. 2. However, alternate belts only are trained over the lower foremost roll 22, while the remaining belts by-pass this roll, to provide a staggered array which is of no significance in relation to the present invention but which is described in our co-pending European patent application 82106409, which corresponds to U.S. Pat. No. 4,399,746 issued Aug. 23, 1983. Upwardly extending runs 46, 48 of the belts 42 define a bale-forming chamber 50 the ends of which are provided by the sidewalls 14 and gate 34 and which has an inlet 52 for crop received from a pickup 54 beneath it.

In order to accommodate the increasing diameter of a growing bale core in the bale-forming chamber 50, the size of the chamber must also increase and a belt take-up and tensioning mechanism is provided at either side of the machine. These mechanisms include: a pair of rearwardly extending idler arms which are mounted rigidly at the forward end of the main frame 10 on a horizontal transverse shaft 56, providing a pivot connection for the arms, and of which the right-hand arm 58 only is shown; the belt take-up roll 40 which is supported at either end at an intermediate location on the arms 58; and the pair of chamber restricting rolls 36, 38 supported at the free ends of the arms. The arms are biased in an anticlockwise direction (FIG. 2) by a pair of springs, one on either side of the main frame 10, of which only the right-hand spring 60 is shown and only its arrangement will be described, the other being similar. The spring 60 is connected at its lower end by a post 62 to a lever portion 64 of the arm 58, the portion 64 being rigid with the pivot shaft 56, and at its upper end to one arm of a bell crank 66 the other arm of which bears one end of the take-up roll 41. The free end of the lever portion 64 is pivotally connected at a point 67 to the cylinder of a piston and cylinder unit 68, loading the arm 58, of which the piston is in turn pivotally connected to the gate 34 at a point 70, a similar arrangement being provided also on the left-hand side of the machine.

As described thus far the baler is conventional.

On the back of the gate 34 and below it, there is mounted apparatus 72 for wrapping a completed bale with net or foil wrap material which serves to maintain the form of the cylindrical bale. This apparatus 72 includes a trough-shaped holder 74 extending across the width of the gate 34 and containing a roll of net 76. An idler roll 78 is disposed along the outlet of the holder and the net trained over it. A pair of brackets 80 is arranged below the holder 74 and the brackets carry between them a further idler roll 82 and a pair of side-by-side feed rolls 84, 86 of which the roll 86 is driven by an electric or hydraulic motor 88. The net passes over the idler roll 82 and through the nip of the feed rolls 84, 86 by which it is gripped.

A cutting mechanism 89 is mounted on the brackets 80 below the feed rolls 84, 86 to receive the net therefrom and includes a horizontal knife 90 on the gate side of the net and a horizontal hammer 92 on the other side of the net pivotally mounted on the brackets 80 by upwardly extending posts 94. The hammer 92 is loaded at each end by a spring 96 bearing at one end against the hammer and at the other against an abutment 98 fixed to the inward face of the associated bracket 80. The ends of the hammer 92 are received in a slot 100 in each bracket 80 and are pivotally connected to a release lever 102 on the outward face of each bracket, the release lever having a shoulder on its underside in contact with an abutment pin 104. A lift pin 106 on a swing arm 108 of a motor 110 mounted on each bracket 80 is disposed so that it can move upwardly against the underside of the release lever 102 to raise it.

Below the brackets 80 there is a guide plate 112 which slopes forwardly and downwardly, and extends in close proximity to the underside of the belts in a run 114 between the rolls 30 and 32 finally terminating in an upturned end portion which follows the path of the belts to the inlet 52 of the baling chamber 50. The guide plate 112 is positioned to receive net which has passed through the cutting mechanism 89 and to press the net against the belt run 114 to advance it.

In operation, hay lying in a windrow is lifted and conveyed to the baling chamber 50 where the oppositely moving runs 46, 48 of the belts 42 cause the crop to turn clockwise (as viewed in FIG. 2) so as to form a bale core of increasing size which eventually overcomes the tension in the belts brought about by the belt take-up and tensioning mechanisms, and the idler arms 58 consequently swing upwardly and thus the chamber 50 increases in size until a full-sized bale has been formed. The operation of baling so far described is conventional.

The bale is then wrapped with net using the apparatus 72. With crop still being fed to the baling chamber 50 and the bale rotating, the motor 88 is triggered, by means of a switch 116 which is sensitive to a predetermined position of the idler arms 58, to drive the feed roll 86 and hence to advance the net of which the end is, at this stage, level with the knife 90. The net is propelled to the guide plate 112, slides along the plate and reaches the bite between the roll 30 and belts 42 on the one hand and the plate 112 on the other where it is gripped and further advanced by the belt run 114. Finally the net reaches the upturned end portion of the plate 112 and thus enters the baling chamber 50 where it is carried round with the bale.

When three quarters of the circumference of the bale has been wrapped by the net, the flow of hay to the baling chamber is stopped. This can be brought about, for example, by an electrically operated dog clutch (not shown) triggered automatically by counter meter and connected in a drive line to the pick-up 54, only the pick-up being stopped.

By the completion of wrapping, it is desirable to have two full turns of net on the bale so that there is entire overlap of the net. This can be achieved in various ways, and one method is as follows. Wrapping is continued after shut-off of the pick-up 54 until such time as the length of net downstream of the cutting mechanism 89 measures twice the circumference of the bale. This is metered by an electronic counter (not shown) which counts the number of turns of the feed rolls 84, 86 necessary to supply the desired length of net. The counter is connected to a switch for the motor 88 and emits a pulse after the requisite turns to operate the switch to stop the motor. The counter is also connected to a switch for each motor 110 of the cutting mechanism 89 and the motors 110 are switched on by the same signal which causes the motor 88 to stop. The motors 110 turn the swing arms 108 to bring the lift pins 106 into contact with the respective undersides of the release levers 102 and raise the levers about their pivotal connections with the hammer 92 until the shoulders of the levers 102 clear the abutment pins 104, which instantaneously releases the action of the springs 96 impelling the hammer 92 toward the knife 90 and thereby cutting the net therebetween.

The bale continues to turn and the remainder of the cut net is drawn into the chamber 50 to wrap round the bale to complete the double wrap. The belts 42 are stopped, the gate 34 raised by the cylinder units 68, and the wrapped bale is deposited on the ground. The gate 34 is closed and baling can start once more.

Start-up can be brought about automatically, if desired, by an arrangement in which a pressure switch (not shown) sensitive to a predetermined pressure in the hydraulic supply for the gate 34 and for belt tension is triggered, when hydraulic pressure builds up again after closure of the gate, to start crop flow and the baling operation.

With a variable volume baling chamber machine as is the baler in the drawings, the size of the bale produced can of course be varied. This can be accommodated in the net wrapping arrangement simply by adjusting the counter to give its signal at the appropriate number of turns of the feed rolls 84, 86. This adjustment could be made automatically by arranging for it to be done in accordance with the desired position of the idler arms 58 which swing by an amount related to the size of bale.

We claim:

1. In a combination of a bale wrapping apparatus for wrapping a bale with sheet wrapping material, with a baling machine including a plurality of belts supported in side-by-side relationship on a plurality of belt support and take-up rolls arranged so as to define a variable volume baling chamber having an inlet at its bottom, a portion of the belts and some of the support rolls being carried by a discharge gate and arranged to define a lower run of said belts extending between lower rear and lower front locations of the gate with the lower front location being adjacent the inlet to the baling chamber when the gate is in a closed position, the improvement comprising: said bale wrapping apparatus including a holder for a roll of sheet wrapping material mounted to a rear location of said gate, a pair of feed rolls supported by the gate beneath said holder and oriented for receiving wrapping material therebetween and discharging the same downwardly; a guide means mounted to the gate and being located for intercepting wrapping material discharged by said drive rolls and extending beneath said gate for directing the wrapping material into the inlet of the baling chamber; and a cutting mechanism for the wrapping material mounted to the gate in a location between the feed rolls and the guide means and adapted for selectively cutting off a length of wrapping material from a roll once the length is wrapped about a bale.

2. The combination defined in claim 1 in which the guide means comprises a plate located sufficiently close to said lower run of the belts that wrapping material will be gripped between said plate and the belts and advanced by the belts to the inlet.

3. The combination defined in claim 1 in which the cutting mechanism comprises a fixed, transversely extending knife, a hammer, means mounting the hammer for movement between a non-release condition spaced from said knife and a release condition engaging said knife, biasing means connected to the hammer and urging the latter toward said knife; and releasable holding means coupled to the hammer for holding the latter in said non-release condition, and release means including a motor drivable to release said holding means from the hammer.

4. The combination defined in claim 3 wherein said holding means includes a release lever pivotally connected to the hammer, an abutment for the lever for holding it in a non-release position corresponding to the non-release condition of said hammer, and an arm drivable by the motor against the lever to shift it away from its non-release position to release the hammer.

5. The combination defined in claim 3 wherein a pair of support brackets are respectively secured to opposite sides of the gate, a guide slot provided in each support bracket with each slot receiving an outer end of the hammer, and a mounting post for the hammer pivotally connected to each bracket and rigid with the hammer.

* * * * *